United States Patent
Stevens et al.

(10) Patent No.: US 6,778,656 B1
(45) Date of Patent: Aug. 17, 2004

(54) TELECOMMUNICATIONS SYSTEM, SERVICE CONTROL POINT AND METHOD FOR ESTABLISHING AT LEAST ONE NEW DIALING PLAN UTILIZING THE TRADITIONAL INTERNATIONAL DIALING PLAN

(75) Inventors: Gilman R. Stevens, Fairview, TX (US); Babu V. Mani, Plano, TX (US)

(73) Assignee: Alcatel, Paris (FR)

( * ) Notice: Subject to any disclaimer, the term of this patent is extended or adjusted under 35 U.S.C. 154(b) by 608 days.

(21) Appl. No.: 09/653,939

(22) Filed: Sep. 1, 2000

(51) Int. Cl.[7] ............................................. H04M 7/00
(52) U.S. Cl. ........................... 379/221.01; 379/221.15; 379/219
(58) Field of Search ........................... 379/221.01, 219, 379/220.01, 221.02, 221.13, 221.15, 213.01

(56) References Cited

U.S. PATENT DOCUMENTS

| | | | |
|---|---|---|---|
| 5,333,185 A | * 7/1994 | Burke et al. | ............ 379/127.01 |
| 5,748,724 A | 5/1998 | Sonnenberg | |
| 5,754,640 A | * 5/1998 | Sosnowski | ............. 379/221.01 |
| 5,764,745 A | * 6/1998 | Chan et al. | ............ 379/221.13 |
| 5,768,358 A | 6/1998 | Venier et al. | |
| 6,310,948 B1 | * 10/2001 | Nemeth | ................. 379/213.01 |

FOREIGN PATENT DOCUMENTS

WO   WO 97/25849   7/1997

* cited by examiner

*Primary Examiner*—Benny Tieu
(74) *Attorney, Agent, or Firm*—William J. Tucker; Craig A. Hoersten; V. Lawrence Sewell

(57) ABSTRACT

A telecommunications system, service control point and method are provided that can establish specialized dialing plan(s) utilizing one or more of the unused country codes in the traditional international dialing plan. In particular, the telecommunications system could translate the digits of a telephone call having an international access code and a previously unused country code to direct the telephone call to a service provider instead of a foreign country. The service provider could then manage one of the new dialing plans and offer a variety of services to their customers including, for example, global vanity numbers, global local number portability, global Internet access, and private dialing plans.

22 Claims, 2 Drawing Sheets

US 6,778,656 B1

TELECOMMUNICATIONS SYSTEM, SERVICE CONTROL POINT AND METHOD FOR ESTABLISHING AT LEAST ONE NEW DIALING PLAN UTILIZING THE TRADITIONAL INTERNATIONAL DIALING PLAN

BACKGROUND OF THE INVENTION

1. Field of the Invention

The present invention relates in general to the telecommunications field and, in particular, to a telecommunications system, service control point and method capable of establishing specialized dialing plan(s) utilizing one or more of the unused country codes in the traditional international dialing plan.

2. Description of Related Art

Currently, one of the most significant concerns for telecommunications companies is the fact that there is a limited number of available area codes, seven digit telephone numbers, vanity numbers and 800/900 telephone numbers . . . . The telecommunications companies have cause to be concerned about the limited number of telephone numbers, because their customer base is continually expanding and there are a lot more people nowadays that require two or more telephone numbers to operate all of their different communications devices including the wired phone, mobile phone, pager, facsimile machine etc. . . . Therefore, it is just a matter of time before the telecommunication companies use up the limited number of phone numbers. Unfortunately, the telecommunications companies to date have failed to develop an efficient and economical way of increasing the number of telephone numbers that can be made available to their customers. As such, there has been and is a persistent need in the telecommunications field to develop an efficient and economical way of increasing the number of available telephone numbers.

BRIEF DESCRIPTION OF THE INVENTION

The present invention includes a telecommunications system, service control point and method that can help a telecommunications company to effectively increase the number of available telephone numbers by using the traditional international dialing plan to establish one or more new dialing plans. In particular, the telecommunications system could translate the digits of a telephone call having an international access code and a previously unused country code to direct the telephone call to a service provider instead of a foreign country. Alternatively, the telecommunications system could translate the digits of a telephone call having an "access code" followed by a digit sequence similar to the traditional international dialing plan to direct the telephone call to a service provider. The service provider could then manage one of the new dialing plans and offer a variety of services to their customers including, for example, global vanity numbers, global local number portability, global Internet access, and private dialing plans.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
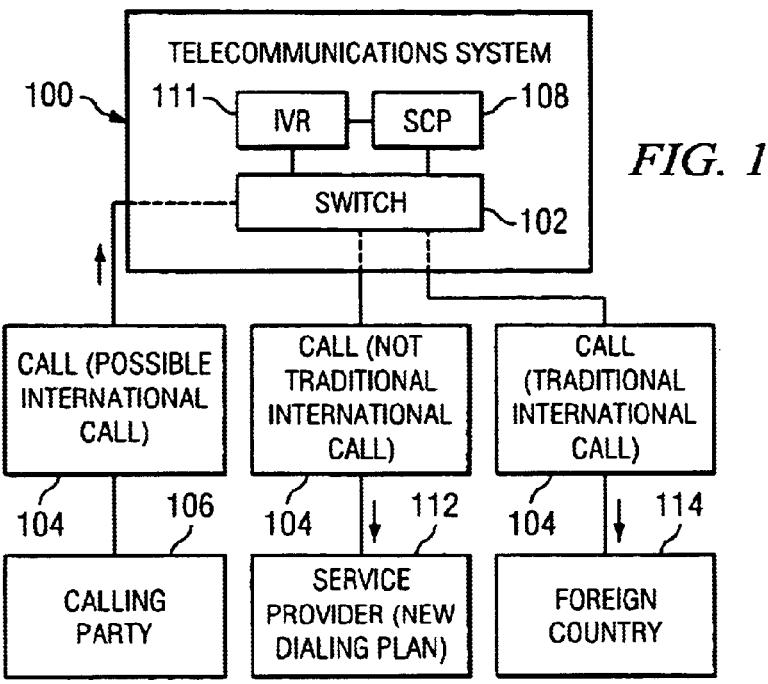
FIG. 1 is a block diagram illustrating the basic components of a telecommunications system in accordance with the present invention.
Figure 3:
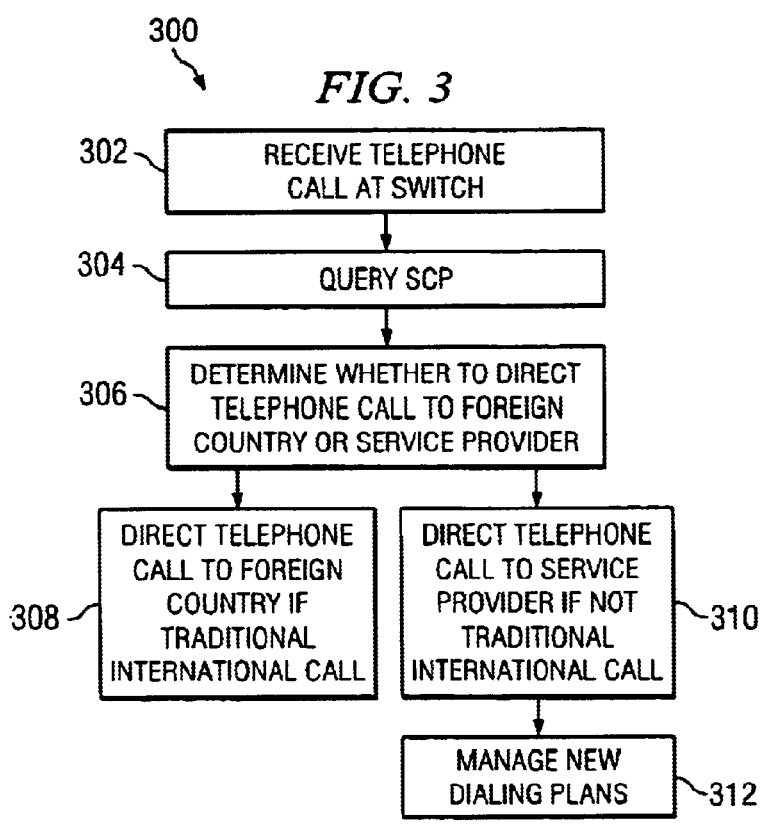
FIG. 3 is a flowchart illustrating the steps of a preferred method in accordance with the present invention.
Figure 2:
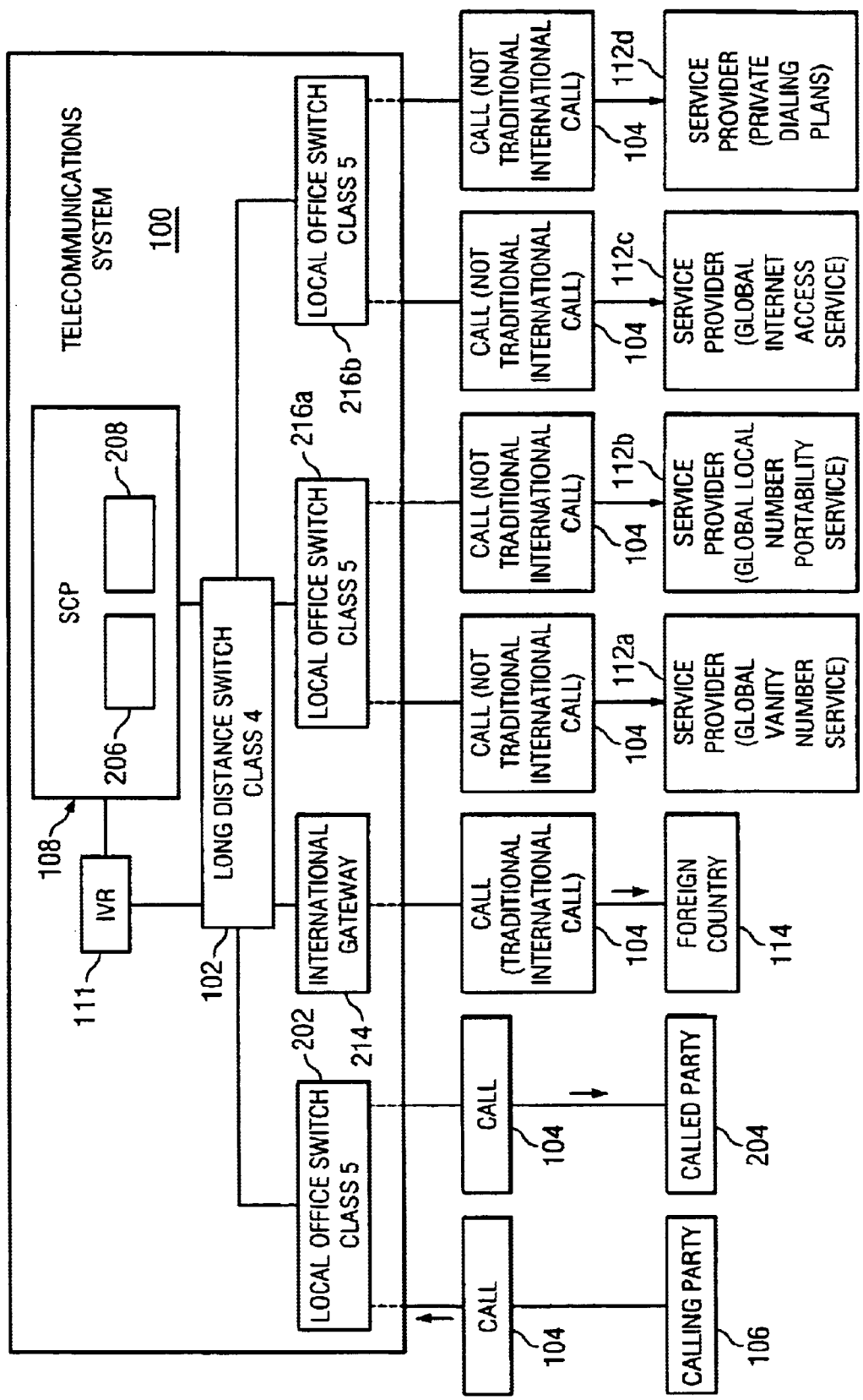
FIG. 2 is a block diagram illustrating in greater detail the components of the telecommunications system shown in FIG. 1.

Referring to FIGS. 1–3, there are disclosed a preferred embodiment of a telecommunications system 100, service control point (SCP) 108 and method 300 in accordance with the present invention. Basically, the present invention enables a telecommunications company to use the traditional international dialing plan to establish one or more new dialing plans. In particular, the telecommunications system would translate the digits of a telephone call having an international access code and a previously unused country code to direct the telephone call to a service provider instead of a foreign country. The service provider could manage one of the new dialing plans and offer a variety of services to their customers including, for example, global vanity numbers, global local number portability, global Internet access, and private dialing plans.

Referring to FIG. 1, there is a block diagram illustrating the basic components of the telecommunications system 100 in accordance with the present invention. The telecommunications system 100 includes a switch 102 (e.g., service switching point (SSP)) capable of receiving a telephone call 104 (possible international call) originated by a calling party 106. The switch 102 can forward information associated with the call to the SCP 108. The SCP 108 has routing algorithms that can determine where to direct the telephone call 104 depending on the digits of the telephone call 104. The telecommunications system 100 also includes an interactive voice response system (IVR) 110 (described below) located between the SCP 108 and the switch 102.

The SCP 108 can direct the telephone call 104 (not traditional international call) to a service provider 112 (only one shown) if the telephone call 104 has an international access code and a country code that was once an unused country code in the traditional international dialing plan but is now associated with the service provider 112. In addition, the SCP 108 can direct the telephone call 104 (traditional international call) to a foreign country 114 (only one shown) if the telephone call 104 has an international access code and a country code in accordance with the traditional international dialing plan.

Referring to FIG. 2, there is a block diagram illustrating in greater detail the components of the telecommunications system 100. Certain details associated with the telecommunications system 100 are known in the industry and as such need not be described herein. Therefore, for clarity, the description provided below in relation to the telecommunications system 100 omits some components not necessary to understand the present invention.

The calling party 106 using an electronic device such as a wireless phone, land based phone, computer or personal digital assistant (PDA) originates the telephone call 104 towards a local office switch 202. A local service provider such as Southwestern Bell manages the local office switch 202. Typically, the local office switch 202 connects the calling party 106 to a called party 204 if the telephone call 104 has a three-digit area code that is within the coverage area of the local service provider. This type of telephone call 104 is commonly known as a local telephone call or a short-distance toll call.

If the local service provider does not service an area code at which the telephone call 104 is directed, then the local office switch 202 forwards information about the telephone call 104 to a long distance switch 102 (described herein as the switch 102) that is managed by a long distance service provider such as AT&T. The switch 102 can be programmed to forward information about the telephone call 104 to a SCP 108 (e.g., Service Control Point (SCP)) when the telephone call 104 appears to be an international call. Typically, the switch 102 would forward information about the telephone call 104 and query the SCP 108 when the telephone call 104 has an international access code such as "011".

The SCP 108 includes a database 206 and controller 208 capable of interacting with one another to determine whether to direct the telephone call 104 which looks like an international call to the foreign country 114 (only one shown) or to the service providers 112a, 112b, 112c or 112d (only four shown). Essentially, the SCP 108 translates the digits of the telephone call 104 to determine whether to direct the telephone call 104 to one of the service providers 112a, 112b, 112c or 112d or to the foreign country 114.

The SCP 108 can direct the telephone call 104 through an international gateway 214 to the foreign country 114 when the telephone call 104 includes an international access code and a country code associated with the foreign country 114. For instance, the SCP 108 could direct a telephone call 104 to France when that telephone call 104 has an international access code (e.g., "011"), a country code (e.g., "33") associated with France, a city code and a number. It is well known that the traditional international dialing plan requires that an international telephone call include an international access code+country code+national number (city code+number).

In addition, the SCP 108 can use the newly assigned and previously unused country codes in the traditional international dialing plan to direct what appears to be an international telephone call 104 through another local office switch 216a or 216b (or even an international gateway or wireless network) to one of the service providers 112a, 112b, 112c or 112d instead of the foreign country 114. For instance, the SCP 108 could direct a telephone call 104 to service provider 112a when the telephone call 104 has an international access code (e.g., "011") and a country code (e.g., "999") which is now associated with service provider 112a. Again, the previously unused country codes (e.g., "999") in the traditional international dialing plan are now used by the present invention to direct the telephone call to service providers 112a, 112b, 112c or 112d instead of a foreign country.

More specifically, the digit string dialed by the calling party 106 includes (a) the international dialing plan access code, (b) the country code (1–3 digits long), and (c) the national number (1 to 15 digits long). When this dialing plan is used for the proposed vanity dialing plan, the digit string is interpreted a bit differently: (a) the international dialing plan access code along with a previously unused country code serves as the vanity dialing plan access code, (b) a 3 digit service provider identification, (c) the vanity number assigned to a subscriber (as specified by the service provider), and (d) an optional suffix to identify the call type. Note that when the service provider identification, the subscriber number, and the suffix are concatenated (joined; placed next to each other), they look like a national number in the international dialing plan.

If there are sufficient number of unused country codes and only a limited number of service providers, then these previously unused country codes can be assigned to specific service providers. In this case, there is no need to have a separate service provider identification; the country code will identify both the vanity dialing plan and the service provider at the same time. But, the above proposal to have a separate service provider identification is made due to the limited number of unused country codes and the possible objections to reassign these unused country codes.

The proposed vanity dialing plan can also be implemented via a separate vanity dialing plan access code specifically assigned for this purpose. With this method, the vanity dialing plan implemented using this newly assigned vanity dialing plan access code (instead of the proposed vanity dialing plan access code utilizing the international dialing plan access code and a previously unused country code). The examples provided below are meant to illustrate the great flexibility of the new dialing plans made available by the present invention.

As mentioned above, the service provider 112a, 112b, 112c or 112d can design and manage a new dialing plan to offer one or a variety of services to their customers including, for example, global vanity numbers, global local number portability, global Internet access, and private dialing plans. Following are exemplary descriptions of some of the different dialing plans that can be implemented by service providers 112a, 112b, 112c or 112d using the present invention.

Referring to service provider 112a, this service provider 112a may design and manage a new dialing plan that can provide a global vanity number service. Basically, the service provider 112a would provide an individual or company with a constant phone number that a calling party 106 can use to access them from anywhere in the world regardless of a geographic location of the calling party 106 and regardless of an underlying service provider.

For instance, the service provider 112a may provide the following telephone number to an individual:

International access code-999-76484

The international access code depends on the particular location of the calling party 106. For example, the international access code is "011" if the calling party 106 is located in the United States.

The "999" is one of the previously unused country codes in the traditional international dialing plan which is now associated with service provider 112a.

The "76484" is a number that can be associated with an individual having the last name of SMITH, where the letters in SMITH correspond to the numerals "76484" on a telephone keypad. The calling party 106 may also need to dial a "#" (or some predetermined key) after "76484" to indicate they are at the end of the vanity number.

The calling party 106 need only dial "011-999-76484" to reach the service provider 112a and hear or view a personalized dialing plan associated with the individual having the vanity name of SMITH. For instance, the individual may have a personalized dialing plan as follows:

0—Live (follow-me)
1—Voice Mail
2—Cellular
3—Video
4—Facsimile
5—PDA (e.g., instant messaging)
6—email
7—password access (e.g., family and friends)
8—personal web page 9—premier services (e.g., precedence and preemption) etc. . . .

The calling party 106 would select the appropriate digit to try and contact the individual or leave a message for the individual. Alternatively, the calling party 106 may dial the telephone number to retrieve their messages including individual voice mails, facsimiles and emails. Of course, the service provider 112*a* can offer a wide-variety of personalized services to the individual.

Since, the service provider 112*a* can design their own dialing plan, the number of digits in the vanity portion ("76484") of the telephone call 106 is not fixed. For example, the service provider 112*a* may assign the following telephone number to a college (e.g., University of Texas):

International access code-999-88

Again, the international access code depends on the particular location of the calling party 106. For example, the international access code is "011" if the calling party 106 is located in the United States.

Again, the "999" is one of the previously unused country codes in the traditional international dialing plan which is now associated with service provider 112*a*.

The "88" is a number that can be associated with the University of Texas also known as UT, where the letters in UT correspond to the numerals "88" on a telephone keypad. The calling party 106 may also need to dial a "#" (or some predetermined key) after "88" to indicate they are at the end of the vanity number.

The calling party 106 need only dial "011-999-88" to reach the service provider 112*a* and hear or view a personalized dialing plan associated with the University of Texas. For instance, University of Texas may have a personalized dialing plan as follows:

```
0 - General Information
1 - Facsimile
2 - Financial Aid
3 - Various Academic Departments:    0 - History
                                     1 - Engineering
                                     2 - Medical
                                     3 - Law
                                     etc...
4 - Admissions
5 - Housing
6 - Web Page
7 - Reach an employee (e.g., input extension)
etc...
```

The calling party 106 would select the appropriate digit to try and contact the appropriate department or person. For instance, the calling party 106 may use a PDA or computer to call the global vanity number "011-999-88" and select "6" to have access to UT's web page. Again, the service provider 112*a* can offer a wide-variety of personalized dialing plans to a college or company.

It should be understood that there could be a service provider 112*a* that has their own access code (previously unused country code) which supports a vanity numbering plan having a predetermined number of digits. For instance, a customer of a service provider 112*a* managing a 10-digit vanity dialing plan could be reached by dialing "011-996-(10-digit vanity number)". Or, a customer of the service provider 112*a* having a 5-digit vanity dialing plan could be reached by dialing "011-995-(5-digit vanity number)". Typically, the 5-digit (or less digits) vanity dialing plan would cost the subscribers/service providers more to use than the 10-digit (or mode digits) vanity dialing plan. The service provider 112*a* handles all the infrastructure and direct physical mappings to connect the telephone call 104 to the traditional dialing plans. Again, the traditional dialing plans do not change since the present invention is an augmentation to the traditional dialing plans using the unused international country codes.

It should also be understood that the service provider 112*a* could apply the same numbering convention described above to Internet URL's (uniform resource locators) and email addresses. For instance, the vanity name could be handled in multiple xxxy.xxxy type combo's at the front of the @ sign, where the last .xxxy combo specifies one of the following:

.em (email)

.vm (voice mail)

.fax (facsimile)

.pda (send to pda)

.iph (Internet phone)

.cph (cellular phone)

.wph (work phone)

.hph (home phone)

.fm (follow me/find me)

The postfix to the @ sign such as @vanityservice.com (for example) could identify the service provider 112*a* that handles the overall routing function. Therefore, the user can have a one Vanity prefix, and the service provider 112*a* can translate and route the original information to the user as specified.

Referring to service provider 112*b*, this service provider 112*b* may design and manage a new dialing plan that can provide a global local number portability service. Today, local number portability applies only to within Local Access Transport Area (LATA) boundaries, and very rarely across metroplex area codes. The service provider 112*b* could design a dialing plan very similar to the global vanity number service that would support local number portability. Like, the global vanity service, the service provider 112*b* would provide an individual or company with a constant phone number that a calling party 106 can use to access them from anywhere in the world regardless of a geographic location of the calling party 106 and regardless of an underlying service provider.

Referring to service provider 112*c*, this service provider 112*c* may design and manage a new dialing plan that can provide a global Internet access service. Basically, the service provider 112*c* can automatically connect a calling party 106 that happens to be traveling to their Internet service provider without requiring the calling party 106 to look-up a local access code and then re-configure their computer to connect to their Internet service provider. This global Internet access service can be provided to customers of the service provider 112*c* regardless of a geographic location of the calling party 106 and regardless of an underlying service provider.

For instance, the service provider 112*c* (e.g., American On Line) may provide their customers with the following telephone number:

International access code-265

Again, the international access code depends on the particular location of the calling party 106. For example, the international access code is "011" if the calling party 106 is located in the United States.

The "265" is one of the previously unused country codes in the traditional international dialing plan which is now associated with service provider 112*c*. In fact, the letters AOL correspond to the numerals "265" on a telephone keypad. The calling party 106 may also need to dial a "#" (or some predetermined key) after "265" to indicate they are at the end of the vanity number.

The calling party 106 need only dial "011-265" to reach the service provider 112c and to hear or view the services available. For instance, the AOL may have a personalized dialing plan as follows:

0—New Customers
1—Technical Assistance
2—Billing
3—Traveling Customers (e.g., automatic connection)
4—Web Page
5—Reach an employee (e.g., input extension) etc. . . .

The calling party 106 could enter "3" if they are a traveling customer that would like to be directly connected to their Internet service provider. To directly connect the calling party 106, the service provider 112c may ask the calling party 106 where they are currently located. Alternatively, the service provider 112c could determine the location of the calling party 106 by reviewing their B-number. Then, the service party 212c determines the access code associated with the current location of the calling party 106. Lastly, the service provider 112c could directly connect the calling party 106 to their Internet service provider using the correct local access code.

Referring to service provider 112d, this service provider 112d may design and manage a new dialing plan that can provide a wide-variety of services. Exemplary dialing plans are provided below to illustrate the type of services that can be provided using the present invention.

First, the service provider 112d may be assigned the following telephone number:

International access code-998

Again, the international access code depends on the particular location of the calling party 106. For examples the international access code is "011" if the calling party 106 is located in the United States.

The "998" is one of the previously unused country codes in the traditional international dialing plan which is now associated with service provider 112d. The calling party 106 may also need to dial a "#" (or some predetermined key) after "998" to indicate they are at the end of the initial number.

The calling party 106 need only dial "011-998" to reach the service provider 112d and to hear or view the options available with the new dialing plan. For instance, the service provider 112d may develop and implement a private dialing plan that has the following options:

411—Global voice directory services
511—Global email help services (voice assisted)
911—Global emergency response services
111—Internet access services:
  111—American On Line
  222—MCI Internet Services
  333—AT&T Internet Services
  444—Southwestern Bell Internet Services
  555—Mindspring etc. . . . The calling party 106 could enter the appropriate digit to reach a particular service. It should be noted that the calling party 106 could directly contact Mindspring by dialing "011-998-111-555" and bypass having to view/listen to the layout of the dialing plan.

In another example, the service provider 112d may be assigned the following telephone number:

International access code-911

Again, the international access code depends on the particular location of the calling party 106. For example, the international access code is "011" if the calling party 106 is located in the United States.

The "911" is one of the previously unused country codes in the traditional international dialing plan which is now associated with service provider 112d. In fact, the numerals "911" are often associated with the telephone number one calls in case of an emergency. Again, the calling party 106 may also need to dial a "#" (or some predetermined key) after "911" to indicate they are at the end of initial number.

The calling party 106 need only dial "011-911" to reach the service provider 112d which can help the calling party 106 obtain emergency services any where in the world regardless of a geographic location of the calling party 106 and regardless of an underlying service provider. To help the calling party 106, the service provider 112d could ask the calling party 106 where they are currently located. Alternatively, the service provider 112c could determine the location of the calling party 106 by reviewing their B-number.

It should be understood that the SCP 108 can be programmed to manage the dialing plans and interact with the calling party 106. The IVR 111 (or Internet Protocol-Service Resource Point (IP-SRP)) can be used to communicate back-and-forth with the calling party 106. As such, the telephone call 104 to a service provider 112a, 112b, 112c or 112d but instead could program the SCP 108 and the IVR 111 to manage a dialing plan.

Referring to FIG. 3, there is a flowchart illustrating the steps of the preferred method 300 that can direct what appears to be an international telephone call to either a foreign country 114 or a service provider 112a, 112b, 112c or 112d. Beginning at step 302, the switch 102 receives the telephone call 104 that was originated by the calling party 106. Again, the long distance service provider manages and controls the switch 102 (class 4 switch) which receives the telephone call 104 from the local office switch 202 (class 5 switch).

At step 304, the switch 102 forwards information about the telephone call 104 and queries the SCP 108 when the telephone call appears to be an international call.

At step 306, the SCP 108 determines whether to direct the telephone call 104 to the foreign country 114 or the service provider 112a, 112b, 112c or 112d. To do this, the SCP 108 has routing algorithms that can determine where to direct the telephone call 104 depending on the digits of the telephone call 104.

At step 308, the SCP 108 directs the telephone call 104 to a foreign country 114 whenever the telephone call 104 has an international access code and a country code that is part of the traditional international dialing plan.

At step 310, the SCP 108 directs the telephone call 104 to the appropriate service provider 112a, 112b, 112c or 112d whenever the telephone call 104 has an international access code and a country code that was once an unused country code in the traditional international dialing plan but is now associated with a service provider 112a, 112b, 112c or 112d. To date of the 999 country codes possible in the international dialing plan only about 277 of them are assigned to a country, which means that there are around 723 unused country codes which can be used to establish a wide variety of new dialing plans. In addition, the new dialing plans can be based upon 15-digits which gives the service providers 112a, 112b, 112c and 112d a great deal of flexibility in designing their new dialing plans.

Thereafter at step 312, the service provider 112a, 112b, 112c or 112d receives the telephone call 104 and manages a dialing plan that can offer a variety of services to their customers including, for example, a global vanity number service, a global local number portability service, a global Internet access service, and a private dialing plan service.

It should be understood the many different dialing plans can be implemented by using just one of the unused country codes of the traditional international dialing plan. Moreover, a country could implement the present invention simply be re-defining their traditional dialing plans.

From the foregoing, it can be readily appreciated by those skilled in the art that the present invention provides a telecommunications system, service control point and method capable of enabling a telecommunications company to use the traditional international dialing plan to establish one or more new dialing plans. As disclosed, the present invention would likely be of special interest to switch manufacturers, network operators and Internet service providers.

Although several embodiments of the present invention has been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A method for establishing a new dialing plan, said method comprising the step of:
   using an international dialing plan to direct a call to-a particular service provider managing the new dialing plan if the call has an international access code and a country code that was an unused country code in the international dialing plan but is now associated with the particular service provider.

2. The method of claim 1, further comprising the step of using the international dialing plan to direct the call to a particular country if the call has an international access code and a country code associated with the particular country.

3. The method of claim 1, wherein said new dialing plan supports at least one of the following services including global Internet access, global vanity numbers and global local number portability.

4. A method for directing a call to either a service provider or a foreign country, said method comprising the steps of:
   receiving the call originated by a calling party;
   directing the call to the foreign country if the call includes an international access code and a country code associated with the foreign country; and
   directing the call to the service provider managing a dialing plan if the call includes an international access code and a country code associated with the service provider.

5. The method of claim 4, wherein said country code associated with the service provider was an unused country code in a traditional international dialing plan.

6. The method of claim 4, wherein said dialing plan can be divided into a plurality of dialing plans.

7. The method of claim 4, wherein said dialing plan supports a global vanity number service.

8. The method of claim 4, wherein said dialing plan supports a global local number portability service.

9. The method of claim 4, wherein said dialing plan supports a global emergency service.

10. The method of claim 4, wherein said dialing plan supports a global Internet access service.

11. The method of claim 10, wherein said service provider upon receiving the call is able to directly connect the calling party to an Internet service provider.

12. A telecommunications system capable of directing a call to either a service provider or a foreign country, said telecommunications system comprising:
    a switch capable of receiving the call originated by a calling party; and
    a service control point capable of directing the call to the foreign country when the call includes an international access code and a country code associated with the foreign country; and
    said service control point further capable of directing the call to the service provider managing a dialing plan if the call includes an international access code and a country code associated with the service provider.

13. The telecommunications system of claim 12, wherein said country code associated with the service provider was an unused country code in a traditional international dialing plan.

14. The telecommunications system of claim 12, wherein said dialing plan can be divided into a plurality of dialing plans.

15. The telecommunications system of claim 12, wherein said dialing plan supports a global vanity number service in which a customer has a constant phone number regardless of a geographic location of the calling party and regardless of an underlying service provider.

16. The telecommunications system of claim 12, wherein said dialing plan supports a global local number portability service in which a customer has a constant phone number regardless of a geographic location of the calling party and regardless of an underlying service provider.

17. The telecommunications system of claim 12, wherein said dialing plan supports a global emergency service in which the calling party can request emergency aid from anywhere in the world.

18. The telecommunications system of claim 12, wherein said dialing plan supports a global Internet access service which upon receiving the call is able to directly connect the calling party to an Internet service provider.

19. A service control point capable of directing a call to either a service provider or a foreign country, said service control point comprising:
    a database; and
    a controller capable of receiving the call originated by a calling party, and also capable of directing the call to the foreign country when the call includes an international access code and a country code associated with the foreign country, and further capable of directing the call to the service provider managing a dialing plan if the call includes an international access code and a country code associated with the service provider.

20. The service control point of claim 19, wherein said country code associated with the service provider was an unused country code in a traditional international dialing plan.

21. The service control point of claim 19, wherein the functions of said service control point can be performed in a switch.

22. The service control point of claim 19, wherein said call is an email.

* * * * *